United States Patent
Bailey et al.

[11] Patent Number: 6,076,771
[45] Date of Patent: Jun. 20, 2000

[54] SYSTEM AND METHOD FOR CONTROLLING A RE-ENTRY VEHICLE

[75] Inventors: Richard A. Bailey, Canyon Country, Calif.; Aaron Cohen, College Station, Tex.; Dale D. Myers, Encinitas, Calif.

[73] Assignee: Kistler Aerospace Corporation, Kirkland, Wash.

[21] Appl. No.: 09/030,627

[22] Filed: Feb. 25, 1998

[51] Int. Cl.[7] ............................................ B64G 1/62
[52] U.S. Cl. ................................... 244/160; 244/36
[58] Field of Search .................... 244/158 R, 36, 244/160, 162, 164

[56] References Cited

U.S. PATENT DOCUMENTS

| | | | |
|---|---|---|---|
| 3,119,576 | 1/1964 | Nielsen | 244/160 |
| 3,125,313 | 3/1964 | Soderberg | 244/87 |
| 3,156,433 | 11/1964 | White, Jr. | 244/160 |
| 3,260,204 | 7/1966 | Wilkey, Jr. | 102/49 |
| 3,276,722 | 10/1966 | Eggers, Jr. et al. | 244/36 |
| 3,511,453 | 5/1970 | Giagosian | 244/1 |
| 3,534,686 | 10/1970 | Watson | 102/49.5 |
| 3,606,212 | 9/1971 | Paine | 244/15.5 |
| 3,702,688 | 11/1972 | Faget | 244/36 |
| 4,163,534 | 8/1979 | Seeger | 244/3.22 |
| 4,340,197 | 7/1982 | Campbell | 244/160 |
| 4,478,148 | 10/1984 | Applebaum et al. | 102/387 |
| 4,623,106 | 11/1986 | Price, Jr. et al. | 244/160 |
| 4,779,821 | 10/1988 | Sutton | 244/52 |
| 4,784,350 | 11/1988 | Darden | 244/3.1 |
| 4,896,847 | 1/1990 | Gertsch | 244/158 R |
| 5,058,833 | 10/1991 | Carmouche | 244/158 R |
| 5,158,248 | 10/1992 | Mockovciak, Jr. | 244/160 |
| 5,163,640 | 11/1992 | Altobelli | 244/164 |
| 5,568,901 | 10/1996 | Steinnon | 244/63 |
| 5,667,167 | 9/1997 | Kistler | 244/110 E |

OTHER PUBLICATIONS

Gary C. Hudson, "Phoenix: A Commercial, Reusable Single–Stage Launch Vehicle," Pacific American Launch Systems, Inc., date unknown, pp. 1–13.

Donn B. Kirk, et al., "Free–Flight Tests of a Blunt–Nosed Flare–Stabilized Body at Speeds to 8.2km/sec," *J. Spacecraft*, vol. 3, No. 3, Mar., 1996, pp. 374–377.

Maxwell W. Hunter, "Draft II The SSX Spaceship, Experimental," source unknown, Mar. 15, 1998, updated Mar. 11, 1989, 34 pages.

H. O. Ruppe, "Design Considerations for Future Space Launchers," *Acta Astronautica*(?), vol. 29, No. 9, 1993, pp. 705–722 (printed in Great Britain) Pergamon Press Ltd.

*Primary Examiner*—Galen L. Barefoot
*Attorney, Agent, or Firm*—Baker Botts L.L.P.

[57] ABSTRACT

A re-entry vehicle includes a flare-stabilized cylindrical body with a center of gravity displaced from a centerline to define a windward side of the body upon re-entry. The body orients at an angle of attack between the centerline and a velocity vector to generate a lift vector. An actuator moves the lift vector relative to the velocity vector to control the descent of the re-entry vehicle.

26 Claims, 3 Drawing Sheets

SYSTEM AND METHOD FOR CONTROLLING A RE-ENTRY VEHICLE

TECHNICAL FIELD OF THE INVENTION

This invention relates generally to re-entry vehicles, and more particularly to a system and method for controlling a re-entry vehicle.

BACKGROUND OF THE INVENTION

Space satellites either alone or in constellations provide a variety of communication services to subscribers. As subscribers demand more bandwidth and connectivity to support increases in voice, video, and data communications, there is an associated need for more satellite communication systems. Also, with increased efforts to explore and exploit space, there is a need for delivery of a variety of payloads to orbiting space stations and beyond. The existing launch systems that place communication satellites and other payloads into space are primarily expendable vehicles.

The few known reusable systems are not suitable for cost-effective, reliable, and frequent launch services. For example, the space shuttle is a manned reusable vehicle that places large payloads into space, and returns a winged orbiter to the ground for reuse. This manned operation is extremely expensive, complex, and not sized or priced for frequent and cost-effective launches of small to medium-sized payloads, such as communication satellites or space station supplies.

Other systems, such as weapon delivery systems, return portions of a space vehicle through an atmospheric re-entry to the ground. However, these systems are not designed for reuse. Still other systems rely on complex control methodologies that employ wings, movable control surfaces, and powered flight to control the vehicle during re-entry.

SUMMARY OF THE INVENTION

In accordance with the present invention, a system and method for controlling a re-entry vehicle are provided that substantially eliminate or reduce disadvantages or problems associated with previously developed systems and methods. In particular, the present invention provides a flare-stabilized cylindrical body with a center of gravity displaced from the centerline to define a preferred windward side upon re-entry. A control technique moves a lift vector relative to the vehicle's velocity vector to control the descent of the re-entry vehicle.

In one embodiment of the present invention, a re-entry vehicle includes a flare-stabilized cylindrical body having a center of gravity and a centerline. The center of gravity is displaced from the centerline to define a windward side of the body upon re-entry into the atmosphere. The body orients at an angle of attack between the centerline and a velocity vector to generate a lift vector. An actuator coupled to the body moves the lift vector relative to the velocity vector to control the descent of the re-entry vehicle.

Technical advantages of the present invention include a flare-stabilized cylindrical body that can maneuver upon re-entry to a designated landing area without wings, movable control surfaces, or powered flight. This is accomplished by providing a flare-stabilized cylindrical body with a center of gravity offset to define a preferred windward side of the body. Since the windward side is known based on the center of gravity offset, appropriate structure and ablative materials may be strategically located to withstand the aerodynamic heating and forces generated upon re-entry. The body is marginally unstable at a 0° angle of attack, but trims to an angle of attack to produce a lift vector.

An actuator adjusts the lift vector to steer the vehicle to a designated landing area. Throughout this description, actuator refers to any device that adjusts the orientation (e.g., roll, pitch, yaw) of the body. In a particular embodiment, actuator refers to an attitude control system having a number of thrusters to control body orientation. In a particular embodiment, lift vector adjustments are accomplished through a roll angle adjustment with appropriate rate control in the pitch and yaw axes. Other technical advantages are readily apparent to one skilled in the art from the following figures, descriptions, and claims.

BRIEF DESCRIPTION OF THE DRAWINGS

For a more complete understanding of the present invention, and for further features and advantages, reference is now made to the following description, taken in conjunction with the accompanying drawings, in which.

DETAILED DESCRIPTION OF THE INVENTION

Figure 1:
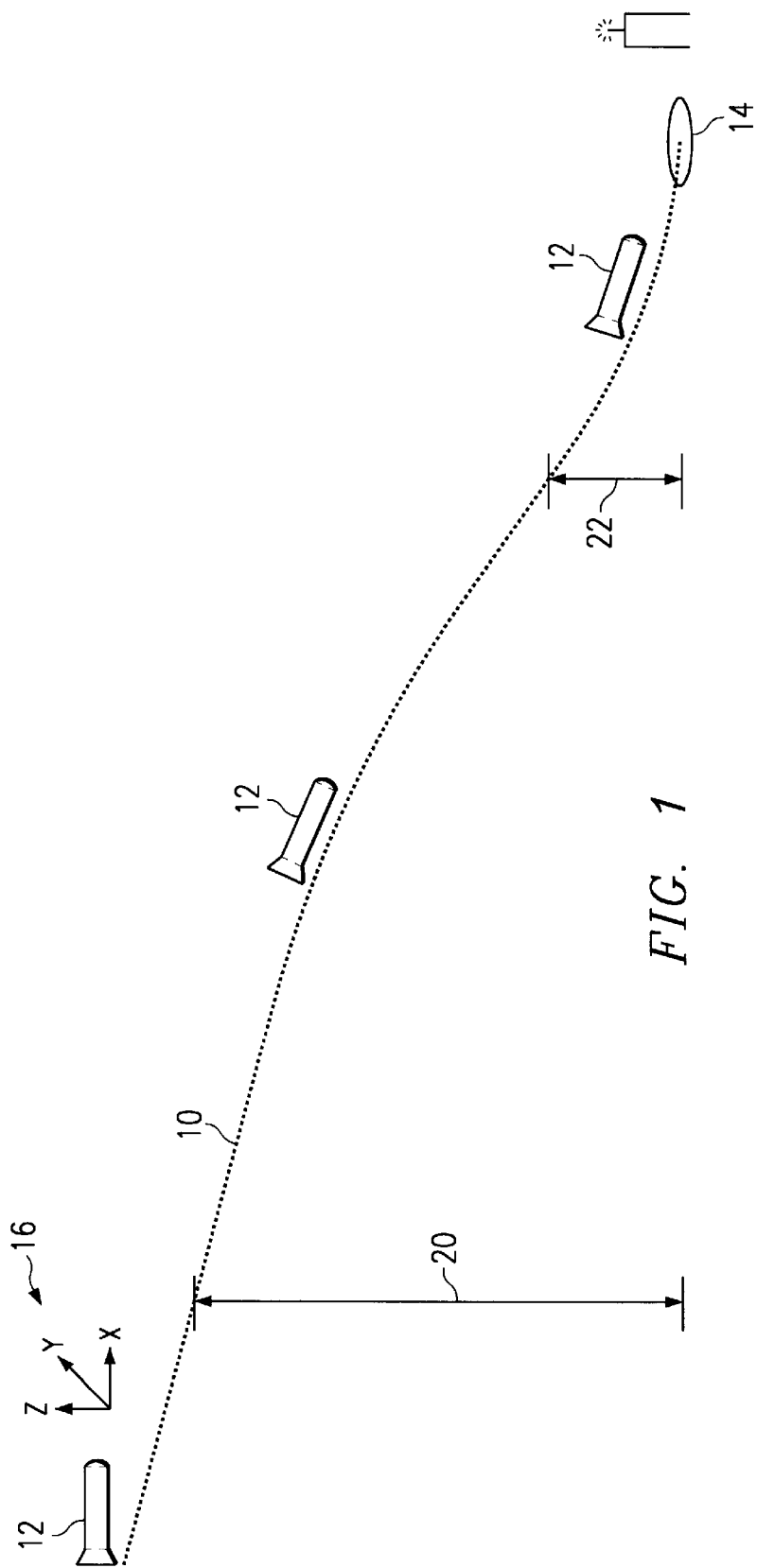
FIG. 1 illustrates the flight profile of a vehicle constructed in accordance with the teachings of the present invention.

FIG. 1 illustrates a flight profile 10 as vehicle 12 travels from space through the atmosphere to a designated landing area 14. Vehicle 12 may be a stage of a launch vehicle returning from space after payload deployment. In general, a control technique described below guides vehicle 12 along flight profile 10 to allow recovery at area 14.

A vehicle-fixed coordinate system 16 defines several of the terms used throughout this description. Coordinate system 16 includes three orthogonal axes that, when the vehicle is in a level horizontal orientation as shown to the left of coordinate system 16 in FIG. 1, are aligned as follows: an x-axis aligns substantially with a longitudinal centerline of vehicle 12; a y-axis points into the page and out the left side of vehicle 12; and a z-axis aligns vertically out of the top of vehicle 12. Coordinate system 16 further defines roll of vehicle 12 about the x-axis, pitch about the y-axis, and yaw about the z-axis.

Flight profile 10 illustrates three different altitude stages for vehicle 12, not necessarily shown to scale. At a first stage above altitude 20, vehicle 12 experiences primarily non-atmospheric conditions, where aerodynamic forces impinging on vehicle 12 are relatively small. At this stage of flight profile 10, vehicle 12 has already deployed its payload in space, and fired orbital maneuvering thrusters and optionally attitude control thrusters to orient vehicle 12 in a nose-down orientation in preparation for re-entry into the atmosphere. At a second stage between altitudes 20 and 22, vehicle 12 experiences increasing aerodynamic forces. Due to the aerodynamic configuration of vehicle 12, explained in detail below, vehicle 12 orients at a selected roll angle to define a preferred windward side of vehicle 12. Vehicle 12 is marginally unstable at a 0° angle of attack, but aerodynamic forces cause vehicle 12 to trim in a stable condition at an angle of attack between its centerline and a velocity vector to generate a lift vector. During this stage of flight profile 10, vehicle 12 maintains a roll angle (e.g., 0° roll angle) to produce maximum lift to counteract the forces of gravity. This also produces significant drag forces on vehicle 12 to begin deceleration, subject to imposed limits for loads and aerodynamic heating. Vehicle 12 may also reduce or remove undesirable oscillations or instabilities using rate control in pitch and yaw.

At a third stage below altitude 22, vehicle 12 assumes two different control modes. In a first mode when the vehicle velocity is greater than Mach 2.5, vehicle 12 utilizes an actuator (e.g., attitude control thrusters) to adjust the lift vector relative to the velocity vector to control the descent of vehicle 12 to region 14. During the same time, vehicle 12 may also control rates in pitch and yaw to reduce or remove unnecessary or undesirable oscillations and instabilities. Before, during, or after entering this third stage of flight profile 10, vehicle 12 may receive an uplink landing offset from site 24 that refines or modifies the position and extent of region 14. In a second mode when the vehicle velocity is less than Mach 2.5, vehicle 12 deploys a drogue parachute in preparation for landing in region 14.

In a particular embodiment, altitude 20 is approximately 390,000 feet, altitude 22 is approximately 125,000 feet, and region 14 represents a circle of approximately 6,000 feet in diameter. For a maximum loading of 6 Gs, the steerability or control ellipse of vehicle 12 is approximately plus or minus 11 nautical miles (±11 nm) downrange and ±4 nm cross-range. Vehicle 12 implements the control technique to overcome dispersions attributable to winds (e.g., ±3 nm downrange and ±1 nm crossrange), air density (e.g., ±5 nm downrange), drag, and misalignments upon re-entry. As described below, the control technique maneuvers vehicle 12 without the requirement for wings, movable control surfaces, or powered flight. However, the present invention contemplates using this control technique to supplement or combine with methodologies that employ wings, movable control surfaces, and powered flight.

Figure 2:
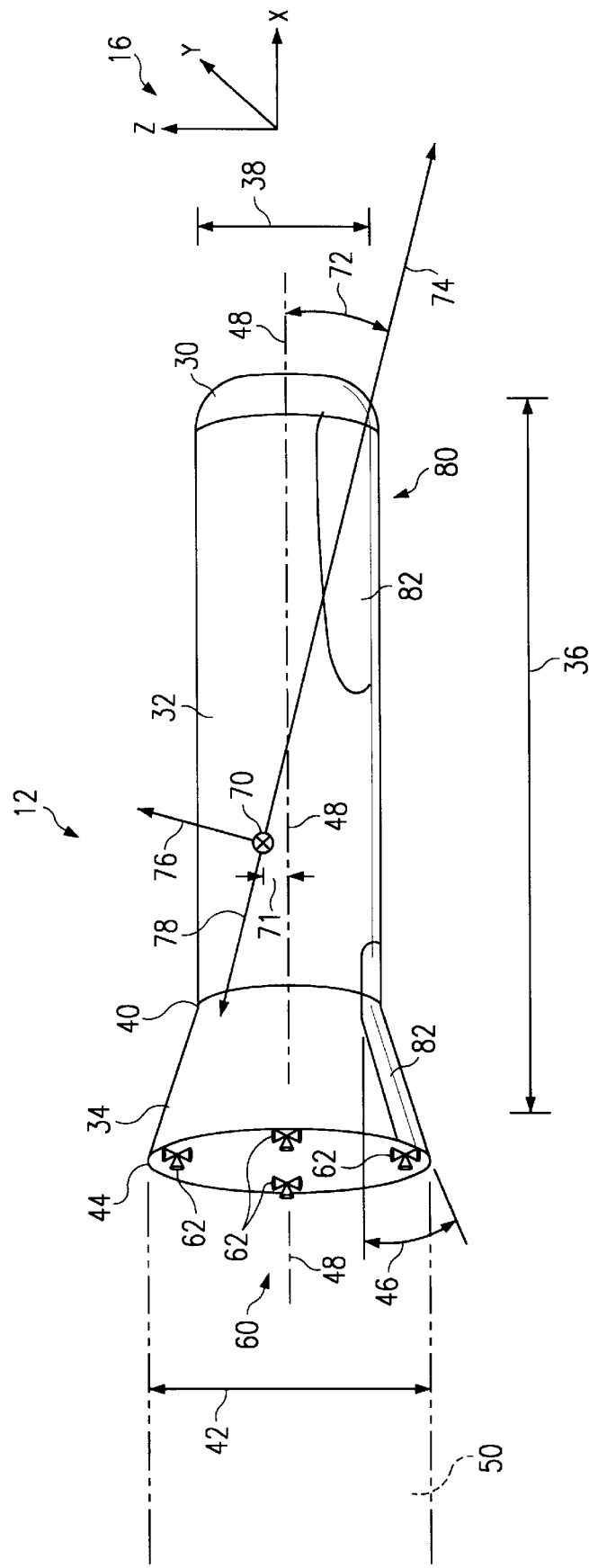
FIG. 2 illustrates in detail the vehicle.

FIG. 2 illustrates in more detail vehicle 12 that includes a nose 30, a cylinder 32, and a flare 34. The overall length 36 of vehicle 12 includes the combined length of nose 30, cylinder 32, and flare 34. Cylinder 32 has a diameter 38, and flare 34 has a similar diameter 38 at the beginning of its forward section 40 which increases to diameter 42 at its aft section 44. Flare 34 extends at an angle 46 from a centerline 48 of vehicle 12. Although shown as a conical shape, flare 34 may comprise one or more sections of curved or flat surfaces that provides stability to vehicle 12. Vehicle 12 is unstable at a 0° angle of attack, but trims to a stable condition at an angle of attack determined, at least in part, by the size and shape of flare 34.

In a particular embodiment, vehicle 12 is axisymmetric with length 36 of approximately 51.1 feet, diameter 38 of approximately 13.7 feet, diameter 42 of approximately 22.0 feet, and flare angle 46 of approximately 21.0 degrees. Nose 30 in this particular embodiment is a blunt nose having a dual radius shape. Vehicle 12 may be an unmanned upper stage of a launch vehicle that includes one or more booster stages 50 coupled to vehicle 12 at aft section 44 of flare 34 during ascent of the launch vehicle.

Vehicle 12 includes an actuator 60 that adjusts the roll, pitch, and/or yaw of vehicle 12. In a particular embodiment, actuator 60 comprises four attitude control clusters 62, with each cluster 62 including three thrusters arranged in a suitable orientation to provide roll, pitch, and/or yaw control to vehicle 12. For this particular design, each thruster in cluster 62 comprises a 150 lbf cold gas jet, and the total impulse of all four clusters 62 is approximately 40,000 lbf-sec. FIG. 2 removes the main engine, orbital maneuvering system (OMS), and other structural features of vehicle 12 to illustrate more clearly the arrangement of clusters 62 of actuator 60.

The components and structure of vehicle 12 after expending its main engine fuel has a center of gravity 70 displaced from a centerline 48 of vehicle 12 by an offset 71. In a particular embodiment, center of gravity 70 is displaced approximately five inches in the positive z-axis direction. Upon re-entry into the atmosphere, vehicle 12 aerodynamically trims at an angle of attack 72 as measured between centerline 48 and a velocity vector 74. Two characteristics of vehicle 12 contribute to angle of attack 72. First, the aerodynamic properties defined by the overall shape of vehicle 12 contribute to a baseline angle of attack. Second, offset 71 of center of gravity 70 contributes an offset angle of attack to the overall angle of attack 72. Angle of attack 72 causes vehicle 12 to generate a lift vector 76 perpendicular to velocity vector 74, and a drag vector 78 parallel to but in an opposite direction as velocity vector 74. Lift vector 76 adds a lateral component to velocity vector 74, and drag vector 78 reduces the magnitude of velocity vector 74 over time to decelerate vehicle 12 upon re-entry.

The force represented by lift vector 76 directed at center of gravity 70 with an offset 71 produces a preferred windward side 80 of vehicle 12 upon re-entry into the atmosphere. As such, ablative materials 82, thermal protection or insulation, and/or additional structural support may be strategically placed on windward side 80 to counteract the aerodynamic heating effects of the atmosphere. Since the placement of center of gravity 70 at an offset 71 causes vehicle 12 to expose the same windward side 80 to the oncoming air stream, this portion of vehicle 12 may be designed and protected to withstand the extreme heat and forces generated upon re-entry.

As discussed above with reference to FIG. 1, vehicle 12 directs lift vector 76 to produce a maximum positive z-axis component throughout flight profile 10 between altitudes 20 and 22. Consequently, drag vector 78 may be maximized during this stage to decelerate vehicle 12, subject to maximum load and heating limits. Below altitude 22, vehicle 12 employs a control technique to maneuver vehicle 12 to region 14. Generally, vehicle 12 controls its descent by adjusting lift vector 76 relative to velocity vector 74.

Figure 3:
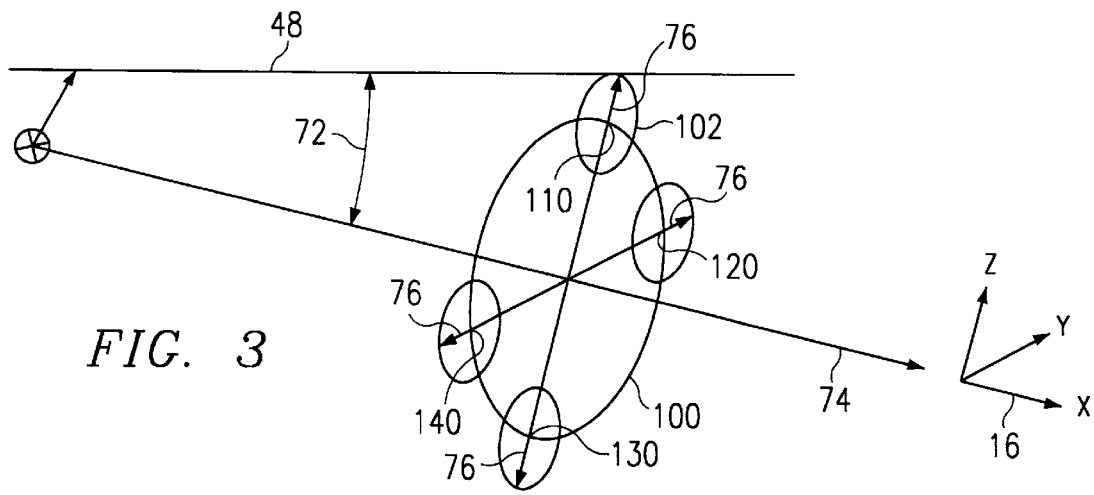
FIG. 3 illustrates a technique for controlling the vehicle.

FIG. 3 illustrates this control technique using a first angle of attack (AOA) circle 100 and a second AOA circle 102. First AOA circle 100 represents the baseline angle of attack of vehicle 12 at various roll positions about velocity vector 74. Second AOA circle 102 represents the offset angle of attack caused by offset 71 of center of gravity 70 of vehicle 12. A radius 104 of first AOA circle 100 represents the baseline angle of attack assumed by vehicle 12 without offset 71, whereas a radius 106 of second AOA circle 102 represents the additional angle of attack caused by offset 71. In a particular embodiment, radius 104 is approximately 8–10° and radius 106 is approximately 2–3°. Therefore, overall angle of attack 72 between velocity vector 74 and centerline 48 is an additive or subtractive combination of the baseline angle of attack represented by first AOA circle 100 and the offset angle of attack represented by second AOA circle 102.

Now referring to second AOA circle 102 at a position 110 on first AOA circle 100. As vehicle 12 adjusts its roll angle using actuator 60, centerline 48 travels about second AOA circle 102, which adjusts the direction of lift vector 76 as well as angle of attack 72 between velocity vector 74 and centerline 48. Depending on the roll angle of vehicle 12, angle of attack 76 may range from a stable condition (e.g., 0° roll angle) when the position of centerline 48 increases angle of attack 72, to an unstable condition (e.g., 180° roll angle) when the position of centerline 48 decreases angle of attack 72.

Adjustment in the roll angle of vehicle 12 causes an adjustment in the direction of lift vector 76 generally about second AOA circle 102. This causes a corresponding increase or decrease in angle of attack 72, but also moves the center of second AOA circle 102 generally around the perimeter or within first AOA circle 100. For example, if actuator 60 on vehicle 12 imparts a positive roll angle to rotate lift vector 76 in a clockwise direction about second AOA circle 102, then the component of lift vector 76 tangential to first AOA circle 100 causes second AOA circle 102 to move from position 110 in a clockwise direction about first AOA circle 100. Continuing to rotate vehicle 12 and lift vector 76 in a controlled manner from a 0° roll angle to a 90° roll angle places second circle 102 at position 120 on first AOA circle 100. In this position, lift vector 76 having a primarily negative y-axis component causes vehicle 12 to turn to the right.

Rotating vehicle 12 and lift vector 76 from a 90° roll angle to a 180° roll angle causes second AOA circle 102 to move to a position 130 on first AOA circle 100. In this position, lift vector 76 having a primarily negative z-axis component causes vehicle 12 to dive. Through a negative roll angle adjustment from position 110 or a further positive roll angle adjustment from position 130, second AOA circle 102 moves to a position 140 on first AOA circle 100. At this orientation, lift vector 76 having a primarily positive y-axis component causes vehicle 12 to turn to the left. Therefore, vehicle 12 can perform any appropriate maneuvers by adjusting its lift vector 76 relative to velocity vector 74 using roll angle control.

The adjustment of lift vector 76 about velocity vector 74 may be accomplished using any suitable control algorithm. In one technique, vehicle 12 rotates about centerline 48 in a coordinated maneuver to move first AOA circle 102 substantially along the path defined by second AOA circle 100. This coordinated maneuver may include roll angle control as well as pitch and/or yaw angle control. As long as lift vector 76 maintains a substantially outward radial component with respect to first AOA circle 100, then angle of attack 72 is large enough to keep vehicle 12 in a stable condition.

In another embodiment, vehicle 12 adjusts roll angle in a more rapid manner, which reduces angle of attack 72 to place vehicle 12 into a marginally unstable condition. For example, at position 110 on first AOA circle 100 vehicle 12 adjusts its roll angle to 180°, which decreases angle of attack 72 and places vehicle 12 in a marginally unstable condition. Through control of pitch and/or yaw rates to damp out aerodynamic oscillations, first AOA circle 102 travels generally through first AOA circle 100 to position 130 where it again achieves stability with increased angle of attack 72. Vehicle 12 may adopt a gradual algorithm, a rapid algorithm, or a suitable combination based on the required vehicle response, loading, dynamic characteristics, actuator requirements, and other suitable factors.

Figure 4:
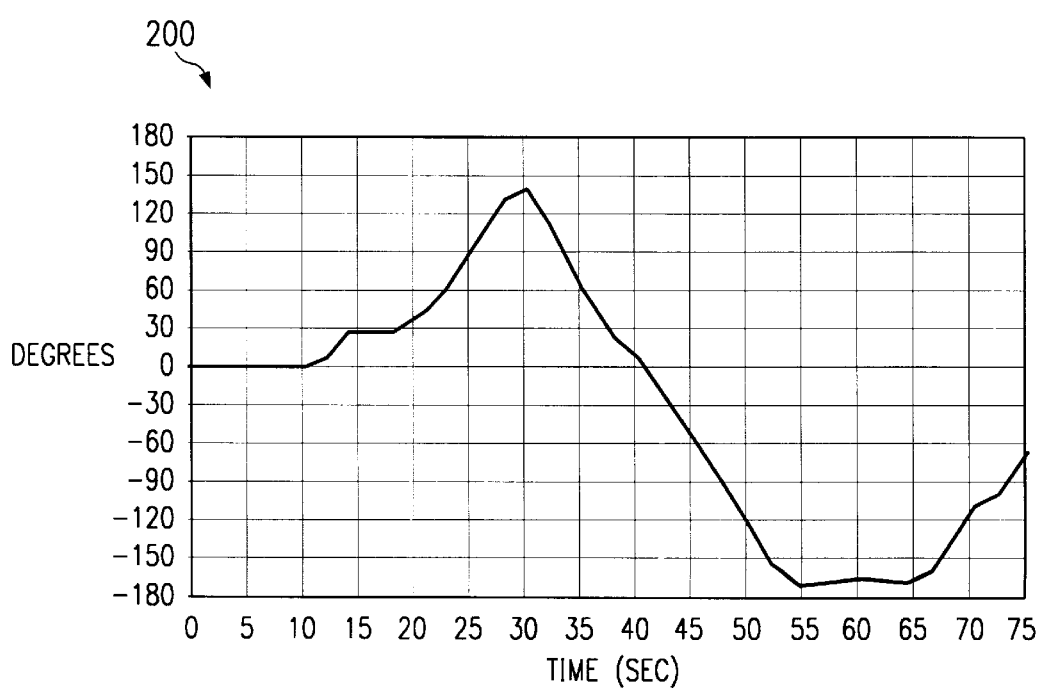
FIG. 4 illustrates an exemplary plot of the roll angle of the vehicle during re-entry.

FIG. 4 illustrates an exemplary plot 200 of the roll angle of vehicle 12 during descent. From approximately zero seconds to ten seconds, vehicle 12 maintains a roll angle of approximately 0°, which corresponds to the phase of flight profile 10 between altitudes 20 and 22. During this time, vehicle 12 directs lift vector 76 to achieve maximum lift and corresponding maximum drag for deceleration, subject to load and heating limits. At approximately ten seconds, vehicle 12 enters the active control stage of flight profile 10 below altitude 22. From ten seconds to thirty seconds, vehicle 12 gradually adjusts its roll angle from 0° to slightly above 1200 to perform a turn to the right in combination with a gradual dive. From approximately thirty seconds to forty seconds, vehicle 12 returns to a 0° roll angle to complete the right turn maneuver. From approximately forty seconds to fifty-five seconds, vehicle 12 adjusts its roll angle to perform a left turn transitioning into a full dive. The full dive with the roll angle at −180° continues until approximately sixty-five seconds, where the roll angle begins to return to 0° in preparation for drogue shoot deployment at approximately seventy-five seconds.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A re-entry vehicle, comprising:
    a flare-stabilized cylindrical body having a center of gravity and a centerline, the center of gravity displaced from the centerline to define a windward side of the body upon re-entry into the atmosphere, the body oriented at an angle of attack between the centerline and a velocity vector to generate a lift vector; and
    an actuator coupled to the body and operable to move the lift vector relative to the velocity vector to control the descent of the re-entry vehicle.

2. The vehicle of claim 1, wherein the flare-stabilized cylindrical body comprises:
    a cylinder having a first diameter, a first end, and a second end;
    a blunt nose coupled to the first end of the cylinder; and
    a flare coupled in a fixed position to the second end of the cylinder, the flare having a generally conical shape increasing in diameter from the first diameter to a second diameter.

3. The vehicle of claim 1, wherein the flare-stabilized cylindrical body has a length of approximately 45 to 60 feet, and comprises:
    a cylinder having a diameter of approximately 11 to 15 feet, a first end, and a second end;
    a blunt nose coupled to the first end of the cylinder; and
    a flare coupled in a fixed position to the second end of the cylinder, the flare having a generally conical shape with a flare angle of approximately 20 to 24 degrees.

4. The vehicle of claim 3, wherein the blunt nose comprises a dual radius shape.

5. The vehicle of claim 1, wherein the center of gravity is approximately 5 to 12 inches from the centerline of the body.

6. The vehicle of claim 1, wherein the center of gravity changes less than 1 inch during the descent of the re-entry vehicle.

7. The vehicle of claim 1, further comprising ablative material coupled to the windward side of the body.

8. The vehicle of claim 1, wherein the actuator comprises a plurality of attitude control thrusters to control a roll angle of the body.

9. The vehicle of claim 8, wherein the thrusters control pitch and yaw rates of the body.

10. The vehicle of claim 1, wherein the body comprises an unmanned reusable upper stage of a satellite launch vehicle.

11. A method for controlling the descent of a flare-stabilized cylindrical body, comprising:
   providing a flare-stabilized cylindrical body having a center of gravity and a centerline, the center of gravity displaced from the centerline to define a windward side of the body upon re-entry into the atmosphere;
   orienting the body at an angle of attack between the centerline and a velocity vector to generate a lift vector; and
   moving the lift vector relative to the velocity vector to control the descent of the re-entry vehicle.

12. The method of claim 11, wherein the flare-stabilized cylindrical body comprises:
   a cylinder having a first diameter, a first end, and a second end;
   a blunt nose coupled to the first end of the cylinder; and
   a flare coupled in a fixed position to the second end of the cylinder, the flare having a generally conical shape increasing in diameter from the first diameter to a second diameter.

13. The method of claim 11, wherein the flare-stabilized cylindrical body has a length of approximately 45 to 60 feet, and comprises:
   a cylinder having a diameter of approximately 11 to 15 feet, a first end, and a second end;
   a blunt nose coupled to the first end of the cylinder; and
   a flare coupled in a fixed position to the second end of the cylinder, the flare having a generally conical shape with a flare angle of approximately 20 to 24 degrees.

14. The method of claim 13, wherein the blunt nose comprises a dual radius shape.

15. The method of claim 11, wherein the center of gravity offset is approximately 5 to 12 inches from the centerline of the body.

16. The method of claim 11, further comprising the step of changing the center of gravity by less than 1 inch during the descent of the body.

17. The method of claim 11, wherein the step of orienting is performed by aerodynamic forces impinging on the body.

18. The method of claim 11, wherein moving the lift vector comprises adjusting a roll angle of the body.

19. The method of claim 11, further comprising controlling pitch and yaw rates of the body.

20. The method of claim 11, wherein the body comprises an unmanned reusable upper stage of a satellite launch vehicle.

21. A launch vehicle, comprising:
   at least one booster stage; and
   an upper stage comprising a flare-stabilized cylindrical body with a length of approximately 45 to 60 feet, the body comprising a cylinder with a diameter of approximately 11 to 15 feet, a blunt nose coupled to a first end of the cylinder, and a flare coupled in a fixed position to a second end of the cylinder and having a generally conical shape with a flare angle of approximately 20 to 24 degrees, wherein the body has a center of gravity displaced from a centerline to define a windward side of the body upon re-entry into the atmosphere, the body oriented at an angle of attack between the centerline and a velocity vector to generate a lift vector, the upper stage further comprising a plurality of attitude control thrusters coupled to the body and operable to move the lift vector relative to the velocity vector to control the descent of the upper stage.

22. The launch vehicle of claim 21, wherein the blunt nose comprises a dual radius shape.

23. The launch vehicle of claim 21, wherein the center of gravity offset changes less than 1 inch during the descent of the upper stage.

24. The launch vehicle of claim 21, wherein the thrusters control a roll angle of the body to move the lift vector relative to the velocity vector.

25. The launch vehicle of claim 21, wherein the thrusters control pitch and yaw rates of the body.

26. The launch vehicle of claim 21, further comprising ablative material coupled to the windward side of the body.

* * * * *